Jan. 23, 1934.  E. A. ALLBERT  1,944,626
COMBINED HEATER AND FIREPLACE
Filed Nov. 14, 1931  2 Sheets-Sheet 1

Inventor
Eugene A. Allbert
By Thomas Bilyeu
Attorney

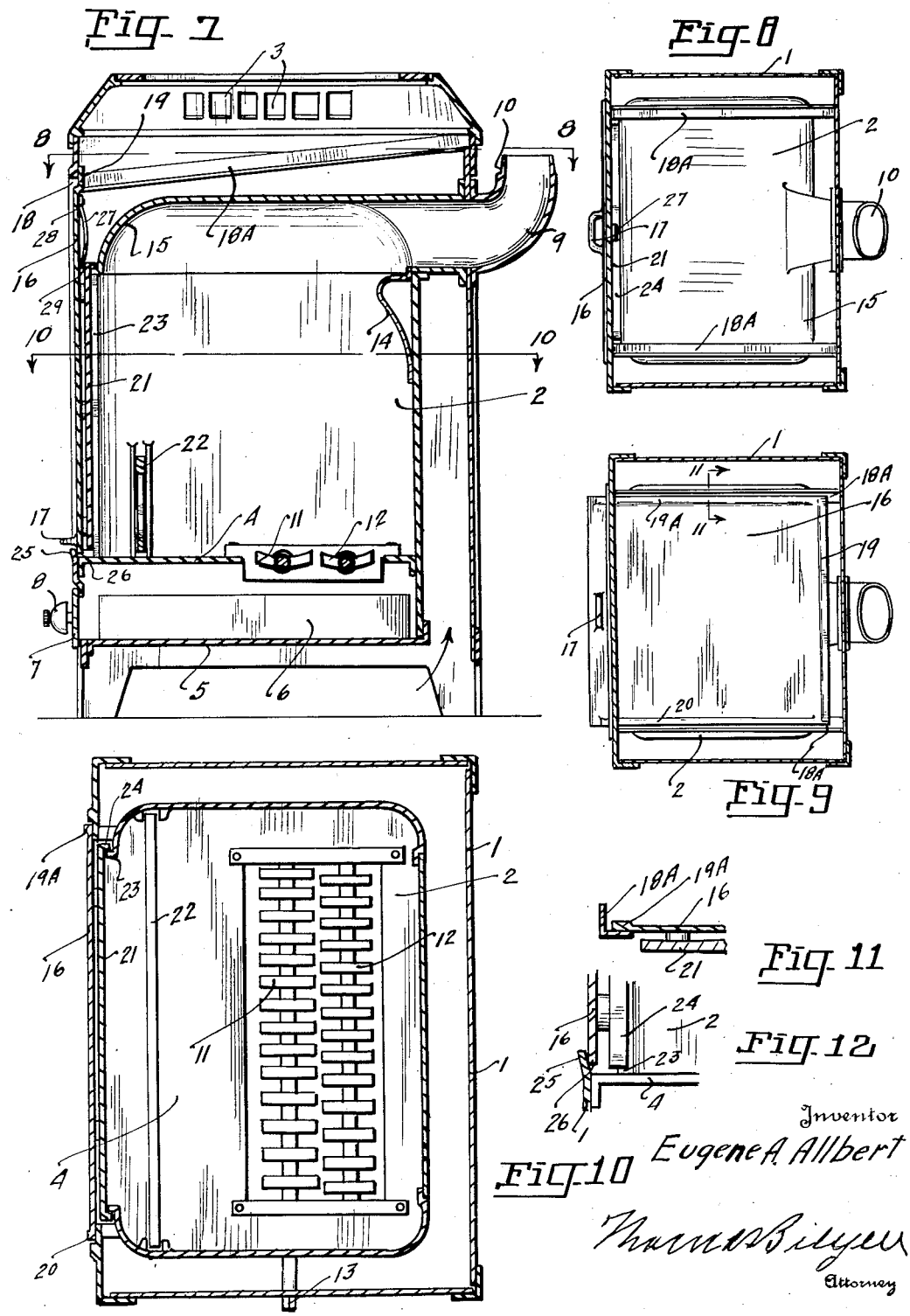

Patented Jan. 23, 1934

1,944,626

UNITED STATES PATENT OFFICE 1,944,626

COMBINED HEATER AND FIREPLACE

Eugene A. Allbert, Portland, Oreg.

Application November 14, 1931
Serial No. 575,087

5 Claims. (Cl. 126—67)

My invention relates to domestic heating appliances, the invention being adapted for placement within the room and for being used with equal facility as a closed heater or as a heater that may be opened and used as an open fire heater.

The invention is comprised of an inner fire pot and an outer shell or casing having a door associated with the front that may be lowered when the device is being used as a closed heater and used for heating purposes only. The door may be raised and carried in the top of the heater when the device is being used as a fire place, or as an open fire.

A smoke outlet is formed integral with the top of the device to which a smoke pipe may be attached. A clean out door is provided within the front, and a removable ash receiver is disposed within the heater. Grates are disposed within the base of the fire pot that are adapted for being agitated from the exterior of the outer casing. The fire pot and the casing are spaced apart at the top, sides and back to permit a free circulation of air being heated therearound.

One of the objects of my invention consists in providing a circulating air heater that may be used with equal facility as a closed heater, or as an open fire heater.

A further object of my invention consists in so constructing the device that it is comprised of few parts and will be of good appearance.

A further object of my invention consists in so placing the fire pot within the casing that it will have a maximum heating capacity.

A still further object of my invention consists in arranging the casing and the fire pot in such a manner that the front wall of the fire pot constitutes the front wall of the casing and so arranging, one relative to the other, that the front wall may be raised and tilted within the casing to form an open, or a closed heater at the will of the user of the same.

With these and incidental objects in view, the invention consists in certain novel features of construction and combination of parts, the essential elements of which are set forth in the appended claims, and a preferred embodiment of which is hereinafter shown with reference to the drawings which accompany and form a part of this specification.

In the drawings:

Fig. 7 is an assembled sectional, side view, the same being taken on line 7—7 of Fig. 1, looking in the direction indicated.

Fig. 8 is a sectional, plan view, of the mechanism illustrated in Fig. 7, the same being taken on line 8—8 of Fig. 7, looking in the direction indicated.

Fig. 9 is a sectional, plan view, of the casing and showing the movable front panel of the casing and the front closure of the fire box in raised position.

Fig. 10 is a sectional, plan view, of the mechanism illustrated in Fig. 7, the same being taken on line 10—10 of Fig. 7, looking in the direction indicated.

Fig. 11 is a fragmentary, sectional, side view, of the side wall near the top of the fire pot, the same being taken on line 11—11 of Fig. 9, looking in the direction indicated.

Fig. 12 is a fragmentary, sectional, side view, of the lower end of the beveled edge of the door panel and the beveled edge of the lip of the casing that is adapted to impart a rear movement to the door panel when the same is fully lowered.

Like reference characters refer to like parts throughout the several views.

Figures 1, 2:
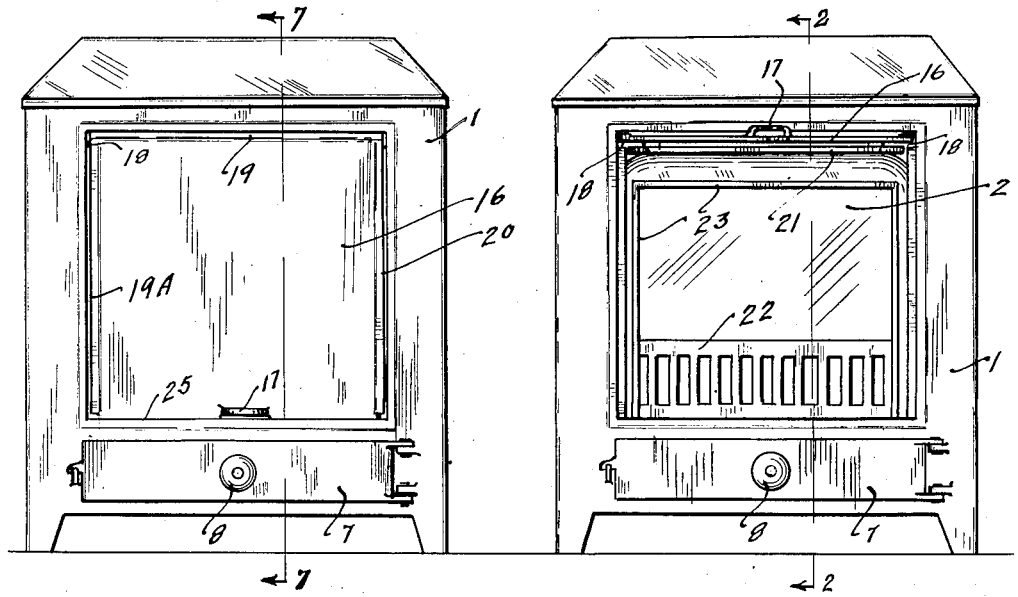
Fig. 1 is a front view of my new and improved heater showing the same ready for use having the fire hidden.
Fig. 2 is a front view of the device illustrated in Fig. 1, and illustrating the front of the device raised and ready for use as an open fire heater.
Figure 4:
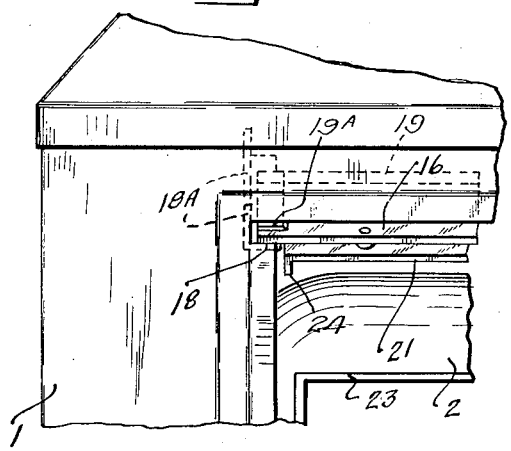
Fig. 4 is a fragmentary, sectional, side view of the casing and of the door raised.
Figure 3:
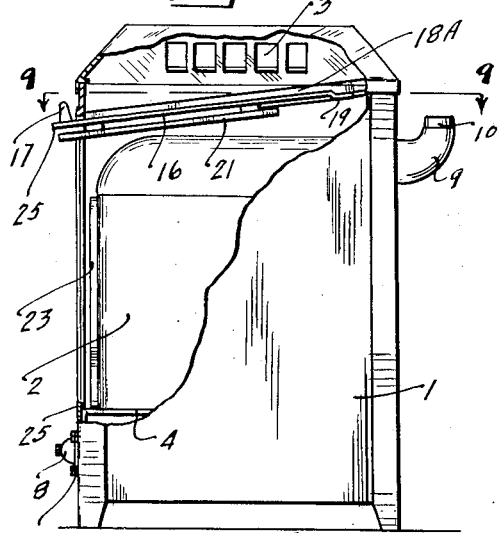
Fig. 3 is a fragmentary, sectional, side view of the device as illustrated in Fig. 2.
Figures 5, 6:
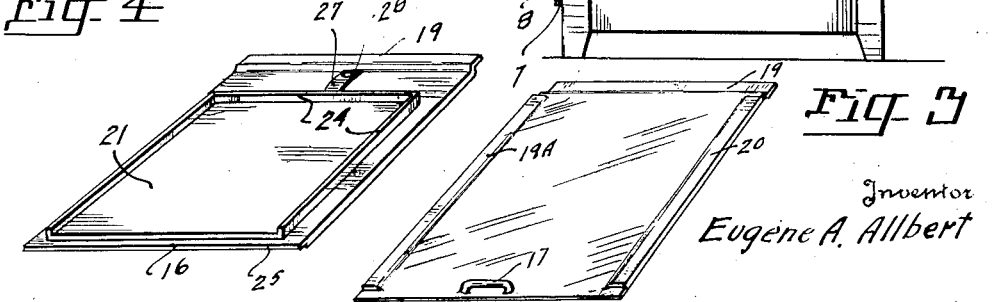
Fig. 5 is a perspective, inverted plan view of the door shown removed from the casing and which comprises the front of the fire box.
Fig. 6 is a perspective, plan end view, illustrating the exterior of the door.

I preferably form my device of an outer casing 1, and an inner fire pot, or fire box 2. The fire box being spaced apart from the outer casing at its sides, bottom and rear in order to permit a free circulation of air therearound, the outer shell being louvered as illustrated at 3 to permit a free circulation of the heated air through the casing. The primary bottom 4 of the fire box is spaced above the secondary bottom 5 sufficiently to place an ash receiver 6 therebetween. An ash receiving door 7 is hingedly secured to the front wall of the lower part of the casing and in registry with the ash receiver. The ash door is of sufficient size to permit the free removal and replacement of the ash receiver therethrough. An adjustable draft 8 is associated with the ash door to permit the regulating of the draft to be developed within the fire box.

A smoke outlet 9 is provided adjacent the top and extending to the rear of the fire pot assembly and a thimble 10 is provided at the top to permit the attachment of a smoke pipe thereto, in the usual manner. Ash grates here shown as two in number at 11 and 12 are positioned within the primary base of the fire box. The grate 12 is fixedly positioned within the fire box and the grate 11 is rockably positioned with a shank 13 extending through the outer side wall of the heater case to provide the attachment of a shaker handle thereto.

A deflector 14 is secured to the rear wall of the fire pot and is placed immediately below the smoke outlet. The purpose being to deflect the flame and to prevent the same entering directly into the smoke outlet. The meeting surfaces of the top and the side and rear walls of the fire pot are rounded, as illustrated at 15 to form a domed ceiling to the fire box.

A relatively large front door 16 is positioned and forms a paneled front wall for the heater and front door for the fire box. A handle 17 is disposed at the base of the panel of the door forming the panel. Guide offsets 18 are provided within the face and at either side of the opening. An offset 19 is provided at the top of the door to permit the door hinging downward about the offset and for being suspended therefrom. Enlarged or reinforced portions 19A and 20 are formed at either side of the door to reinforce the edges thereof against warpage. These portions wipe against the guideways 18A as the door is raised within the guides to transform the fire pot into an open fire place when the panel door is raised. A plate 21 is disposed upon the inside of the door to absorb the heat of the fire and to prevent undue warping and burning of the door itself. A grate 22 is vertically disposed adjacent the front of the opening to maintain the fire within the fire pot and to prevent the same from dropping out when the door is raised. A face 23 that lies in a single plane forms the peripheral edge of the opening in the front wall of the fire box and when the door is lowered to full lowered position maintains a tight fit between the inside of the door and the base of the fire pot. The inner surface of the face 24 of the plate 21 is made to precisely fit the same and to maintain a relatively tight connection therebetween.

The lower edge of the door is beveled as shown at 25 and the lip 26 of the fire pot is beveled so that when the door is fully lowered the inside of the door is made to precisely fit the peripheral face of the fire pot. To further maintain a tight working relation between the door and the face of the opening in the fire pot I place one, or more reacting elements 27 within the case and in the line of travel of the door. The reacting element is secured to the casing by any suitable fastening means as through the use of rivets 28, the free end of the reacting element contacting and reacting against the inner upper surface of the ledge disposed upon the door.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of an outer casing, a fire box disposed within the casing and spaced apart therefrom, except at the front wall thereof, the fire box having a primary and secondary bottom spaced apart to permit an ash receiver being placed therebetween, an ash door hingedly secured to the casing and so placed as to permit the removal of the ash receiver therethrough, a pair of grates disposed upon the primary bottom of the fire box, a grate vertically disposed within the fire box, air louvers disposed through the walls of the casing to permit air circulation therethrough, a guideway formed at each side and within the top of the casing, a door having an offset hinge and normally supported within the guideways, and the inner face of the door and the outer face of the fire pot adjacent the openings being so positioned and formed as to maintain a relatively tight joint therebetween when the door is fully lowered.

2. In a device of the class described, the combination of a casing, a fire pot disposed therein and spaced apart from the casing excepting at its front, the fire box and the casing having a common front wall, the front wall being movable to form a door, guideways formed in each side of the casing, the door having an offset to adapt the same for being suspended from the guideways, and the front wall of the fire box and the inner surface of the door being so formed and positioned as to form a relatively tight connection therebetween when the door is closed.

3. In a device of the class described, the combination of a casing, a fire pot disposed within the casing, the fire pot and the casing having a common front wall formed with an opening and a slidable door therefor, a door guide disposed in each side and extending transversely of the casing and adapted to receive the door therein when the door is raised, an offset disposed within the door on its upper end and a ledge formed in the door on its lower end, a handle disposed upon the outer surface of the lower end of the door, and the inner surface of the door and the peripheral outer edge of the fire box opening being so formed and positioned as to form a relatively tight connection therebetween when the door is fully lowered, and the ledge disposed at the lower end of the door being so made as to engage a lip formed adjacent the lower edge of the casing opening, and a grate disposed longitudinally of the fire box and adapted to maintain the fuel being burned within the fire box.

4. In a device of the class described, the combination of a casing, a fire box disposed within the casing and spaced therefrom excepting at its front wall, a movable panel comprising the major portion of the front of the casing and forming a door for the fire box and casing, a pair of horizontal grates disposed within the primary base of the fire box and a vertical grate formed longitudinally of the fire box and adjacent its front wall, guideways disposed transversely of the casing and adapted for having the front panel moved therebetween, and means associated with the door of the fire box and the casing for forming a relatively tight connection between the inner face of the door and the outer edge of the fire box when the door is fully lowered.

5. In a device of the class described, the combination of a louvered casing, a fire box disposed within the casing and spaced therefrom at its top, its rear and its side walls, the top of the fire box being dome shaped, a smoke outlet extending rearwardly from the fire box and through the rear wall of the casing, primary and secondary bottoms disposed within the fire box, a pair of grates disposed within the primary bottom of the fire box, a grate disposed vertically within the fire box and spaced apart from the front wall of the fire box, a movable panel adapted to form the major portion of the front wall of the casing and the front wall of the fire box, vertical and horizontal door guides formed in the casing permitting the panel to be moved rearwardly upon the guides and for directing and holding the panel in intimate contact with the outer face of the fire box.

EUGENE A. ALLBERT.